United States Patent [19]
Bradbury

[11] 4,191,039
[45] Mar. 4, 1980

[54] SHEET SHAPING METHOD

[75] Inventor: Christopher G. Bradbury, Rumford, R.I.

[73] Assignee: Leesona Corporation, Warwick, R.I.

[21] Appl. No.: 870,925

[22] Filed: Jan. 18, 1978

[51] Int. Cl.² .............. B21D 22/22; B29C 17/04; C03B 23/02
[52] U.S. Cl. .............................. 72/60; 29/421 R; 65/106; 264/544; 264/570
[58] Field of Search ............ 264/89, 93, 237, 348, 264/28; 425/384; 29/421 R; 72/56,60; 65/94,106

[56] References Cited

U.S. PATENT DOCUMENTS

| | | | |
|---|---|---|---|
| 3,007,206 | 11/1961 | Griswold | 264/93 |
| 3,065,501 | 11/1962 | Gasmire | 264/28 |
| 3,450,805 | 6/1969 | Chesser | 264/28 |
| 3,520,020 | 7/1970 | Williams et al. | 264/94 X |
| 3,760,599 | 9/1973 | Bose | 264/28 X |
| 3,783,157 | 1/1974 | Frank | 264/28 X |

*Primary Examiner*—Jan J. Silbaugh
*Attorney, Agent, or Firm*—Robert J. Doherty

[57] ABSTRACT

An improved method and apparatus for shaping sheets of thermoplastic material is disclosed in which sheets are pressure molded against a mold member by the direct application of a liquid coolant under pressure thereto. The coolant contacts the surface of the sheet and upon pressure reduction vaporizes and accordingly, due to the heat of vaporization effect, rapidly absorbs a large amount of heat from the sheet so as to form a solidified skin on the outer surface of the sheet after or simultaneously with the shaping of said sheet. The sheet thus remains in the mold for a shorter dwell time inasmuch as the sheet becomes more quickly shape retentive because of the rapid cooling. This accordingly permits smaller and less bulky equipment to be utilized in sheet shaping processes. The attendant reduction in equipment size can result in substantial cost savings for such equipment.

5 Claims, 4 Drawing Figures

SHEET SHAPING METHOD

BACKGROUND OF THE INVENTION

This invention relates to sheet shaping and more particularly to the fabrication of articles from thermoplastic sheet materials. The shaping or forming of hot thermoplastic sheets to desired shapes is currently done by methods which are either "mechanical" or "pneumatic" wherein a mechanical process involves the use of a solid mold or tool either moving or stationary whereas a pneumatic process involves the use of differential air pressure created either by vacuum or compression. One well-known article formed by such methods are containers for comestibles.

In the thermoforming process for producing such containers, a sheet of thermoplastic material either upon reheating or still sufficiently heated as it emerges from the extruder is contacted by a large wheel-like device having a plurality of molds positioned about the periphery thereof and adapted to contact the sheet and by differential pressure as by the application of vacuum to the center of the wheel enables the sheet to be drawn downwardly upon the mold so as to form sets of individual containers and a nonformed interconnecting material web. As the large wheel rotates, the sheet slowly cools to a point where it is self-supporting whereupon it is withdrawn and the individual containers cut or trimmed from the traveling web or sheet of material. Thus, in order to provide adequate time in which the sheet may become self-supporting after being shaped, it is necessary to provide a rather large peripheral travel distance for such sheet; and, hence, the equipment for such purposes may be necessarily large.

It would, however, be desirable to produce articles such as the above-indicated containers without the need for utilizing such large and accordingly necessarily expensive equipment. Thus, if the time required for the shaped sheet to become self-supporting could be reduced, then the size of such attendant equipment could also be reduced.

Attention is directed to a recently introduced and unique in-die strand cooling process disclosed in U.S. Pat. No. 3,981,959 and issued Sept. 21, 1976, to the assignee of the present application, namely, Leesona Corporation. In such patent, a system which permits drastically increased pelletizing operation efficiencies by means of the introduction of a liquid coolant under pressure into direct contact with the outer surface of a polymeric or other material passing through it, is disclosed. As the coolant enters the die orifice, a portion thereof is immediately vaporized to form at least a solidified outer wall of material surrounding an inner and still somewhat liquid material core. The wall of the orifice is simultaneously lubricated by nonvaporized coolant to facilitate its passage through the die. Such system, available from Cumberland Engineering Company, Inc., Providence, Rhode Island, also contemplates, although not necessarily so, the subsequent cutting of the resultant strands into discrete material lengths or pellets by knives mounted for rotation in respect to the exit face of the die.

The above cited U.S. patent and its discussion constitutes applicant's Prior Art Statement.

SUMMARY OF THE INVENTION

It is accordingly a principal object of the present invention to provide a method and means for shaping thermoplastic sheet material without physically large equipment needs.

A still further object of the invention is the provision of a process and means for sequentially or simultaneously shaping and cooling sheet material so as to drastically reduce the time necessary for such shaped material to become self-supporting.

These and other objects of the present invention are accomplished by a novel shaping method and apparatus comprising, providing a sheet heated to a temperature sufficient to enable it to be shaped by pressure application thereto, placing such heated sheet in proximity to a mold shaping member and thereafter directing liquid coolant under pressure into direct contact with such sheet so as to force said sheet into contact with said member and thereafter vaporizing at least a part of said coolant upon contact with said sheet material to quickly form at least a solidified skin of cooled material on said sheet material surface by reason of the heat of vaporization effect.

Other objects, features, and advantages of the invention shall become apparent as the description thereof proceeds when considered in connection with the acompanying illustrative drawing.

DESCRIPTION OF THE DRAWING

In the drawing which illustrates the best mode presently contemplates for carrying out the present invention.

DESCRIPTION OF THE INVENTION

Figure 1:
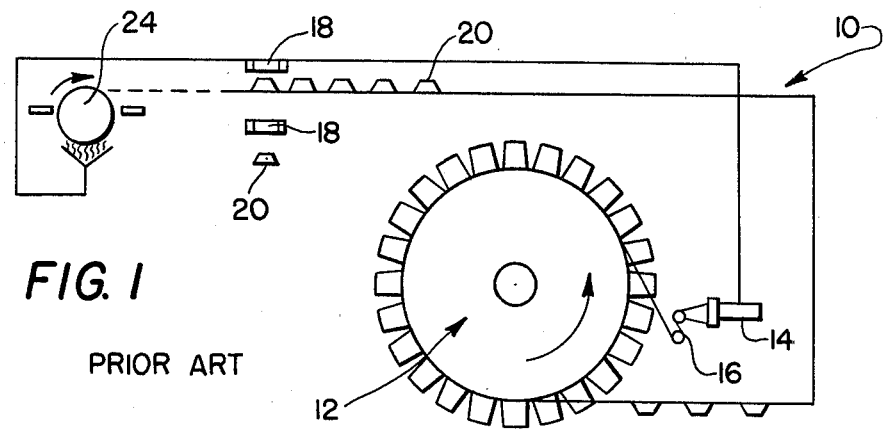
FIG. 1 is a diagramatic view of presently available prior art equipment for thermoforming material sheets.
Figure 2:
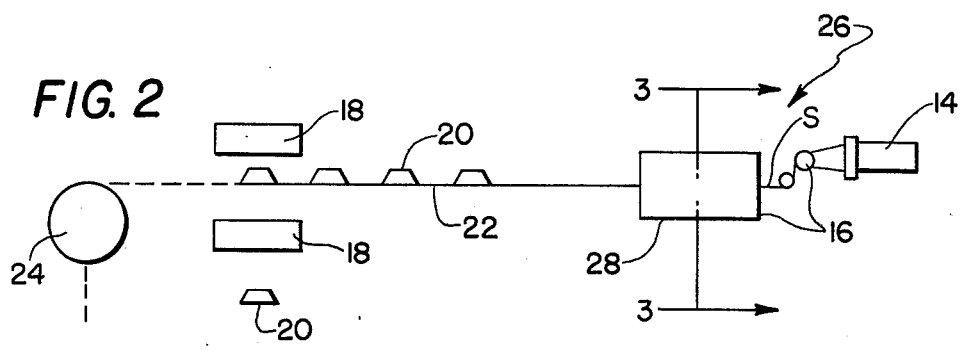
FIG. 2 is also a diagramatic view of a sheet shaping line used in the present invention.
Figure 3:
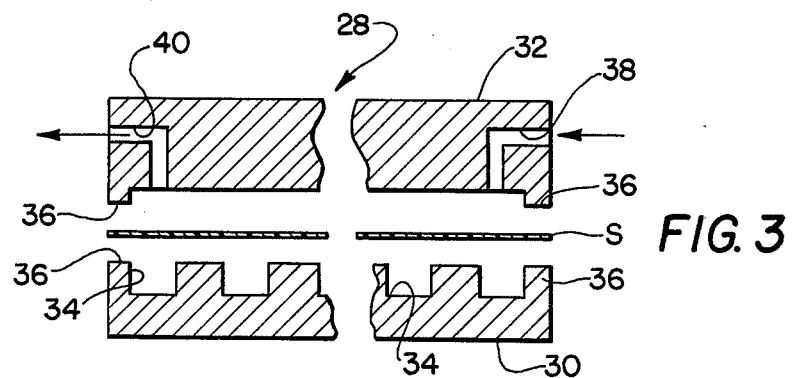
FIG. 3 is an enlarged sectional view of the mold of the present invention in open position taken along the line 3—3 of FIG. 2.
Figure 4:
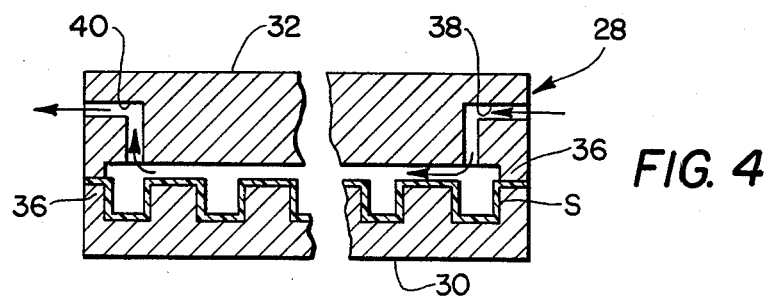
FIG. 4 is a sectional view similar to FIG. 3, but showing the mold in its closed position.

Turning now to the drawing, and in particular FIG. 1 thereof, a forming line 10 incorporating a conventional thermoformer 12 is shown. Thermoplastic material is extruded from an extruder 14 over a pair of chilled rolls 16 which cool the sheet to a forming temperature and then to a multiple station, vertical, rotary press which as through differential air pressure, forms the individual containers. The thus formed web then travels a major portion of the peripheral distance of the thermoformer 12 until self-sustaining in shape and then to a trim press 18 where the individual containers 20 are trimmed from the web 22. The remaining portions of the web are then passed to a grinder 24 and recycled to the extruder 14.

The forming line 26 of the present invention includes a mold 28 having a forming segment 30 and a closure element 32. The forming element or member 30 includes a plurality of mold cavities 34 over which the sheet S is adapted to be placed and be clamped between the edge portions 36 of the respective mold members 30, 32. Additionally, the closure member 32 is provided with an inlet in the form of a bore 38 whereby coolant under a relatively high pressure and at least a pressure sufficient so as to force the sheet S into conformity with the mold cavities 34, may be introduced into the mold 28 on that side of the sheet S opposite from the mold cavities 34. Additionally, a bore 40 is provided through which the coolant may be removed once the sheet has been formed.

Although it is generally contemplated that the sheet material S to be formed by the present invention is a thermoplastic polymeric material such as polyolefins, co-polymers and composites thereof, the process and attendant equipment may also be utilized of other thermoplastic materials such as glass and metal. Although the liquid coolant contemplated is water because of its low-cost and availability, other coolants which are generally non-reactive and immiscible with the thermoplastic material being processed may also be utilized. The terms non-reactive and immiscible are used herein to distinguish materials in a quantitative sense and thus do not exclude materials which could be miscible to an insignificant degree with the material being processed or might be reactive to a non-harmful extent therewith.

In addition to the mold 28, some conventional means for insuring containment of the sheet material S as it emerges from the extruder in a continuous fashion is provided, such that the extra amount of sheet material produced during the dwell time while the mold is closed and shaping the sheet S caught and disposed therebetween, will be accommodated. Such devices may take the form of festooning rolls or vertically and horizontally reciprocal pairs of molds, however, as will hereinafter be more clearly brought out, the dwell time is extremely short due to the plastic cooling effect accomplished by the present invention such that the accommodation for sheet material formed during the dwell time can easily be handled.

In operation the coolant enters the mold 28 through bore or bores 38 so as to force sheet S into immediate and intimate contact with the walls of the cavities 34. Thus, the sheet S is shaped to the configuration of the mold member 30. Thereafter, the mold is either vented to atmosphere through the outlet bore 40 or otherwise depressurized so that at least a portion of the coolant immediately evaporates. Such change of phase from liquid to gas serves to immediately withdraw that amount of heat equal to the heat of vaporization from those surfaces of the material in contact with the coolant. Such action, that is the shaping and depressurizing steps are sequential or to some extent simultaneous; however, as a result thereof, at least those surfaces of the plastic in which the coolant comes in contact with, are solidified at least to the extent of the formation of a skin thereon which enables the sheet to be self-supporting. Once the mold members 30, 32 are separated from each other, the shaped portion of the sheet is withdrawn therefrom for continued downstream processing.

Additionally, the bores 38 and 40 may be provided with valve means (not shown) which coordinate the opening and closing of the bores 38 and 40 in timed sequence, and in this way conserve the amount of liquid coolant utilized. Instead of providing an exit bore 40 through which at least partially vaporized coolant may be withdrawn before the respective separation of the mold members 30, 32, such coolant may be vented to the atmosphere upon opening of the mold 28. In any event, however, the pressure maintained within the mold 28 upon the coolant during the forming of the sheet S is such that the sheet will be forced into intimate contact with the individual mold cavitites 34 by the coolant material in substantially liquid form. This insures that the coolant intimately and entirely contacts the upper surface of the sheet S so as to immediately enable it to become chilled and form a solidified surface skin thereon upon ebullition of the coolant so as to contribute to its self-supporting nature of the sheet upon its removal from the mold 28.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of shaping a sheet of thermoplastic material, comprising providing a sheet at a temperature sufficient to enable it to be shaped by the application of pressure thereto, placing the heated sheet material into an at least partially enclosed mold and disposed in proximity to a shaping member thereof and therafter directing liquid coolant under a pressure sufficient to maintain said coolant in a liquid state and to enable shaping of said sheet into said mold by the direct contact of said coolant with said sheet so as to force said sheet into contact with said member and thereafter depressurizing said mold so as to permit the vaporizing of at least a part of the same said coolant contacting said sheet material, thus quickly removing heat from the surface thereof by means of the heat of vaporization effect so as to form at least a solidified skin of cooled material on said sheet material surface opposite to that surface contacting said mold member and thereafter removing said sheet from said mold.

2. The method of claim 1, wherein said coolant is sequentially admitted to said mold at a first pressure, at least partially removed from said mold at a substantially lower second pressure and thereafter the sheet material removed from said mold.

3. The method of claim 2, including substantially closing said mold about said sheet material.

4. The method of claim 2, wherein said second pressure is above that required to shape said sheet.

5. The method of claim 1, wherein said pressure vaporizing and removal steps are sequential in operation, said mold member being at least partially vented after said coolant contacts said sheet so as to lower the pressure of said mold below a point at which ebullition of the coolant occurs.

* * * * *